United States Patent [19]

Contin

[11] Patent Number: 5,116,023

[45] Date of Patent: May 26, 1992

[54] LOW VIBRATION HIGH VACUUM GATE VALVE

[75] Inventor: Jose L. Contin, Orinda, Calif.

[73] Assignee: MDC Vacuum Products Corporation, Hayward, Calif.

[21] Appl. No.: 701,439

[22] Filed: May 14, 1991

[51] Int. Cl.⁵ ............................................. F16K 25/00
[52] U.S. Cl. ....................................... 251/203; 251/158
[58] Field of Search ............... 251/301, 187, 203, 158

[56] References Cited

U.S. PATENT DOCUMENTS

| | | | |
|---|---|---|---|
| 653,600 | 7/1900 | Wiley | 251/203 X |
| 3,072,378 | 1/1963 | Holderer | 251/158 X |
| 3,973,753 | 8/1976 | Wheeler | 251/301 X |
| 4,718,637 | 1/1988 | Contin | 251/158 |

Primary Examiner—Arnold Rosenthal
Attorney, Agent, or Firm—David B. Harrison

[57] ABSTRACT

A low vibration, high cycle, high vacuum gate valve structure comprises a high vacuum housing defining a passageway, a valve actuator for providing a rectilinear displacement force, a translatable and pivotable gate valve assembly actuated by the valve actuator for translating from a fully retraction position outside of the passageway to an initial closure position adjacent to a fixed seal surface provided within the housing thereby blocking off the passageway. The gate valve assembly defines an angled sealing surface relative to an oppositely facing angled sealing surface of the fixed seal but displaced by a predetermined angular displacement at the initial closure position. The gate valve assembly includes structure defining a first fulcrum at the initial closure position for causing the gate valve assembly to rotate through the predetermined angular displacement in response to further rectilinear displacement force from the actuator until a final closure position is reached at which the gate valve assembly closes and seals against the angled sealing surface of the fixed seal within the housing.

10 Claims, 7 Drawing Sheets

LOW VIBRATION HIGH VACUUM GATE VALVE

FIELD OF THE INVENTION

The present invention relates to valve apparatus for high pressure differential/vacuum operating environments. More particularly, the invention relates to a low vibration high cycle (hereinafter LVHC) gate valve for use in a high vacuum environment.

BACKGROUND OF THE INVENTION

High vacuum gate valves are known in the prior art. Such valves are typically used in severe environments, such as the environments experienced in fabrication processes of integrated circuit semiconductors, for example. Low pressure chemical vapor deposition processes, such as sputtering, plasma, and the like, also require high vacuum conditions in conduits, joints and valves. High vacuum joints and valves are typically formed of corrosion resistant materials such as stainless steel, and they may be required to operate at very high temperatures.

High vacuum gate valves typically provide for actuation from the ambient, and preferably with no loss of vacuum level. The sealing surface of a gate of a high vacuum valve is typically an annular, rectangular or circular surface and gasket that closes with considerable force upon a complementary seating surface during operation.

Prior art control mechanisms for the operation of high vacuum gate valves have typically included a large number of moving parts, for example a complex linkage assembly and locking device attached to the gate portion of the valve, to transfer the linear displacement force applied to the carriage assembly of the gate and thereby force the sealing surface of the gate into contact with the seat of the valve. One such prior art device employing a linkage assembly for operation of a gate valve is disclosed in U.S. Pat. No. 4,681,329, owned by the Assignee of the present invention. The linkage assembly in the 329' patent enables the sealing surface to pivot into contact with the seat of the valve, and a stop dog mechanism maintains the seal.

During fabrication processes of integrated circuit semiconductors, for example, semiconductor wafers typically are conveyed from the ambient through a high vacuum gate valve into a high pressure vacuum chamber. The high vacuum gate valve opens and closes as the semiconductor wafers pass through into the vacuum chamber.

Vibrations are typically generated in a high cycle, high vacuum gate valve during opening/closing operations. These vibrations typically result from the substantial number of linked moving parts required to operate the valve with the force necessary to effect and maintain a vacuum seal. Such vibrations may be transferred to the extremely delicate semiconductor wafers with adverse consequences.

An unsolved need exists for a simplified, yet highly effective LVHC high vacuum gate valve.

SUMMARY OF THE INVENTION WITH OBJECTS

A general object of the invention is to provide an LVHC high vacuum gate valve that overcomes limitations and drawbacks of the prior art.

A more specific object of the invention is to provide a relatively inexpensive LVHC high vacuum gate valve having very few moving parts or linked elements associated with opening and closing the valve.

Another more specific object of the invention is to provide an improved LVHC high vacuum, rectangular gate valve.

Yet another specific object of the invention is to provide an LVHC high vacuum, gate valve having a removable valve seat enabling ready access for e.g. cleaning operations and the like.

Still one more specific object of the invention is to provide an LVHC high vacuum, gate valve having a spring mechanism enabling the gate to pivot slightly in order to close and seal against a facing sealing surface, and race wheels for translating the linear displacement of the gate into rotational displacement in order to actuate the spring pivot mechanism.

A low vibration, high cycle, high vacuum gate valve structure comprises a high vacuum housing defining a passageway, a valve actuator for providing a rectilinear displacement force, a translatable and pivotable gate valve assembly actuated by the valve actuator for translating from a fully retraction position outside of the passageway to an initial closure position adjacent to a fixed seal surface provided within the housing thereby blocking off the passageway. The gate valve assembly defines an angled sealing surface relative to an oppositely facing angled sealing surface of the fixed seal but displaced by a predetermined angular displacement at the initial closure position. The gate valve assembly includes structure defining a first fulcrum at the initial closure position for causing the gate valve assembly to rotate through the predetermined angular displacement in response to further rectilinear displacement force from the actuator until a final closure position is reached at which the gate valve assembly closes and seals against the angled sealing surface of the fixed seal within the housing.

These and other objects, advantages and features of the present invention will become more apparent upon considering the following detailed description of a preferred embodiments, presented in conjunction with the accompanying drawings.

BRIEF DESCRIPTION OF THE DRAWINGS

In the Drawings:

FIGS. 5A and 5B illustrate views of the FIG. 2 gate valve housing.

FIGS. 6A, 6B and 6C are views of the fixed valve seat assembly within the FIG. 5 gate valve housing. FIG. 6B is a sectional view of the FIG. 6A fixed valve seat assembly, taken along the line 6B—6B in FIG. 6A. FIG. 6B also includes a portion of the high vacuum sidewall of the FIG. 5A housing.

DETAILED DESCRIPTION OF PREFERRED EMBODIMENT

Figure 1:
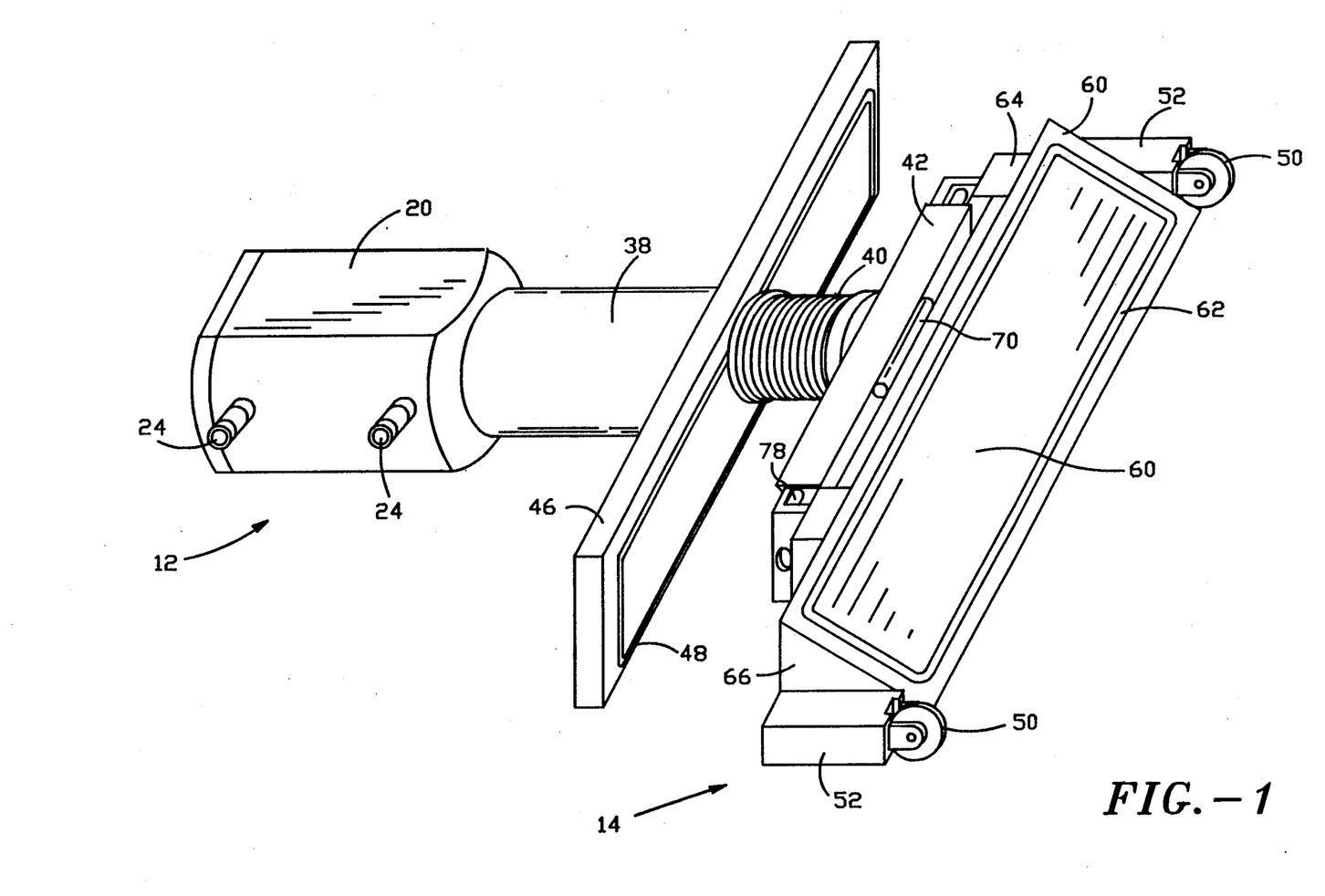
FIG. 1 is an isometric projection view of a preferred embodiment of an LVHC high vacuum gate valve and actuator assembly incorporating principles of the present invention, shown removed from a gate valve housing and mating surface (not shown in FIG. 1.

One presently preferred example of an LVHC, high vacuum, rectangular gate valve and actuator assembly illustrating the principles of the present invention is shown generally at 10 in FIG. 1. While a wide variety of applications within high vacuum processes are clearly contemplated for the gate valve and actuator assembly 10, one particularly useful application in a fabrication process for forming integrated circuits from large diameter (4-8 inch diameter semiconductor wafers, for example.

The gate valve 10 consists of three primary sections: an actuator mechanism 12, a gate assembly 14, and a high vacuum housing 16, shown in FIGS. 2A, 2B, 5A and 5B, for example. The high vacuum housing 16 aligns and secures a removable angled valve seat assembly 18, perhaps illustrated best in FIGS. 6A, 6B and 6C.

Figure 2A:
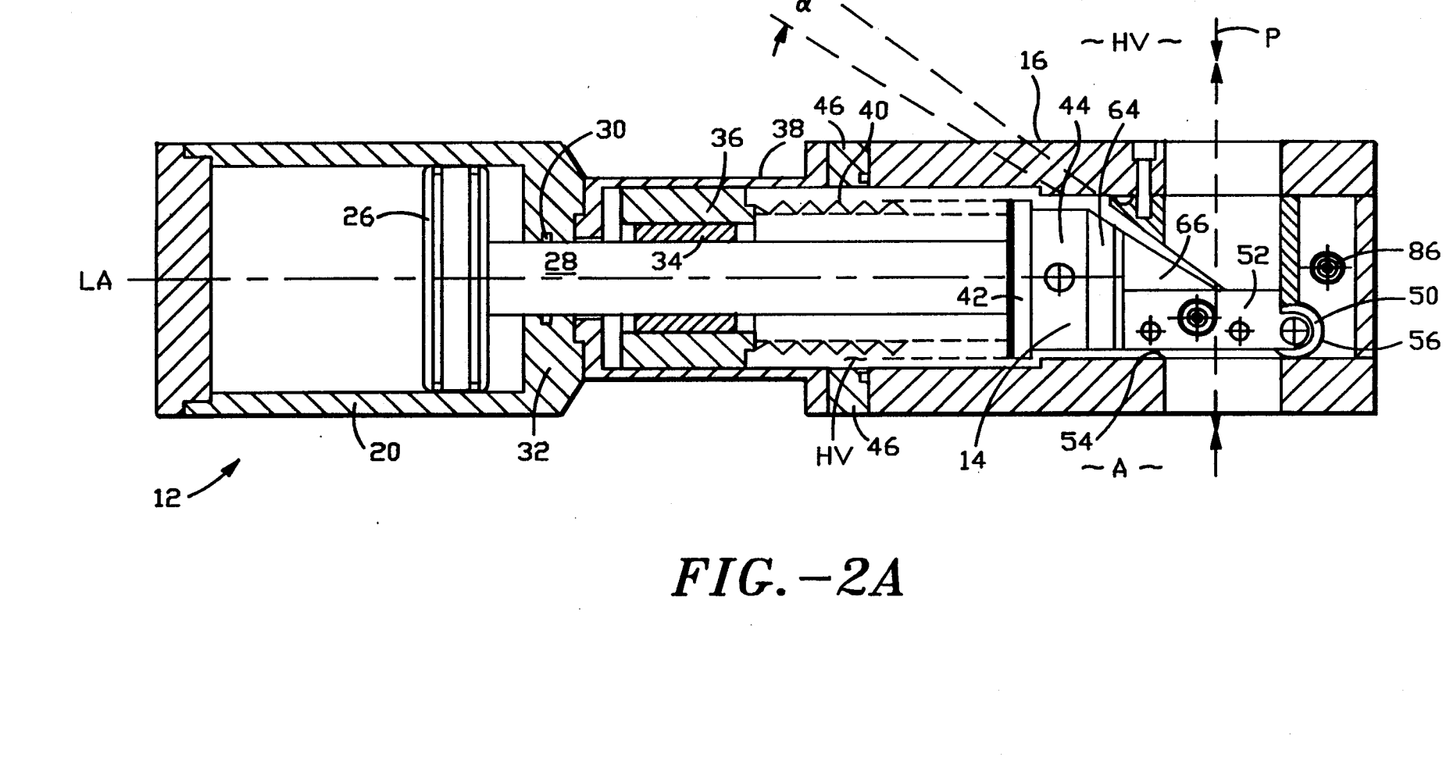
FIG. 2A is a side view in section and elevation of the FIG. 1 LVHC high vacuum gate valve and actuator assembly in engagement relationship with a gate valve high vacuum housing but wherein the valve is not yet sealed.

Turning now to FIG. 2A, the actuator mechanism includes a pneumatic cylinder body 20 enclosed by an end wall. Fittings 24 (FIG. 1) enable connections to a supply of pressurized fluid (dry compressed air) so as to admit and exhaust the pressure fluid relative to the space defined by a cylindrical interior of the body 20. A piston 26 oscillates back and forth along the cylinder between the fittings 24. Thus, driving force from a supply of pressure fluid may be rapidly applied to one or the other sides of the piston 26 so as to move it in a desired direction.

The actuator 12 further includes an actuator rod 28 driven by the piston 26. A seal 30 is mounted in an annular recess formed in an inner end wall 32 and seals the actuator rod 28 relative to the cylinder body 20. An elongated phosphor bronze bushing 34 is mounted within an annular ring 36. The ring 36 and bushing 34 are mounted as a subassembly within a tubular actuator housing member 38 which is mounted to the cylinder base 20. The ring 36 may be press fit into the tubular memboer 38, or may be secured by any other suitable method. A high vacuum seal between the ring 36 and the tubular housing member 38 is required.

The ring 38 also seals to one open end of an accordion high vacuum baffle 40. The baffle 40 connects to a baffle flange 42 at the end of the actuator rod 28 opposite from the piston 26. The baffle 40 thereby separates a high vacuum space HV adjacent the inside cylindrical surface of the tubular housing member 38 from an ambient pressure area A located inside of the baffle 40 and adjacent to the actuator rod 28. The actuator rod 28 rigidly connects to a fixed end plate or bar 42 of the high vacuum valve assembly 14. A wall 46 enables the actuator 12 and valve assembly 14 to be removably secured to an open end of the housing 16. A high vacuum sealing arrangement, as taught in commonly assigned U.S. Pat. No. 4,681,329 may be employed to achieve the requisite high vacuum seal 48 between the wall 46 and the housing 16.

Figure 2B:
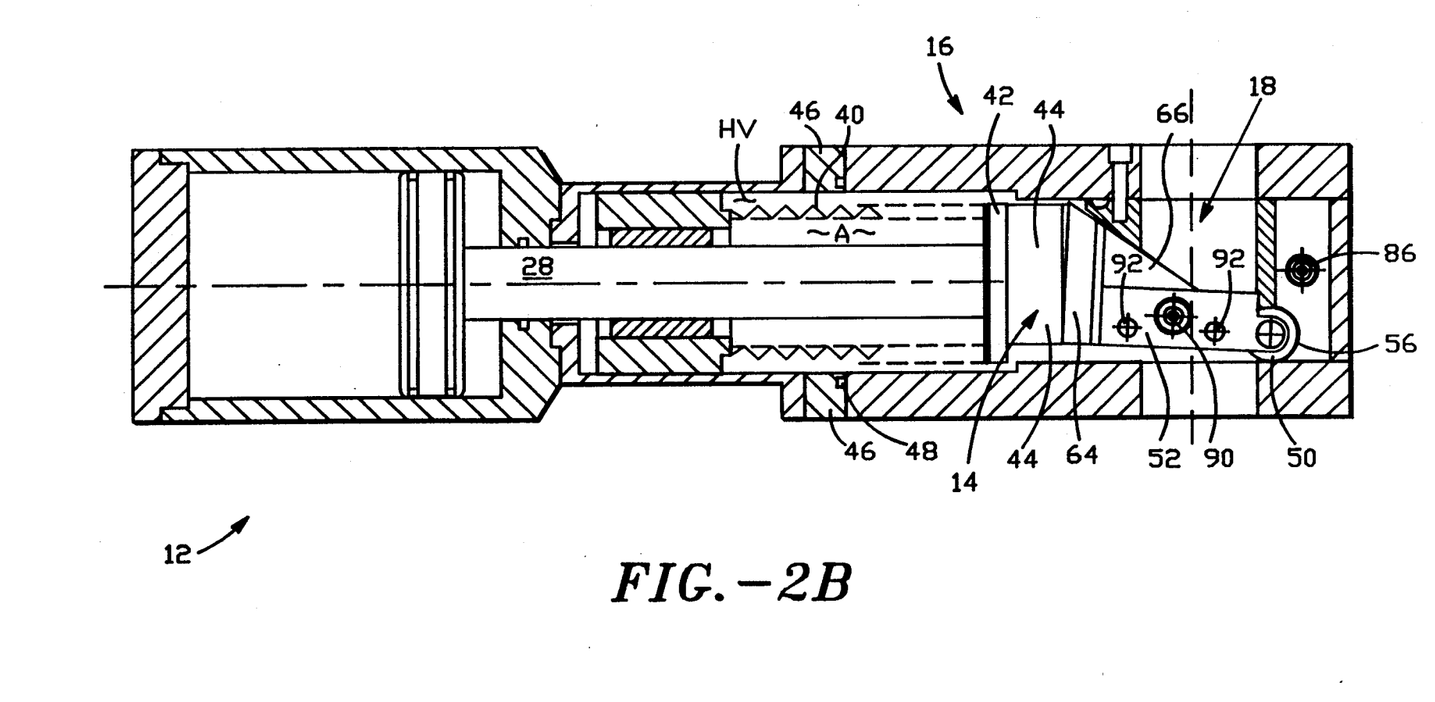
FIG. 2B is the same view as FIG. 2A but with the gate valve shown rotated into a high vacuum sealing engagement with the gate valve housing.

As suggested by FIGS. 1, 2A and 2B, the actuator rod 28 is displaced by a distance directly related to the displacement of the actuator piston 26. When the piston 26 is moved to a position adjacent to the rear end wall 22, the gate valve assembly 14 is likewise displaced to a fully retracted position, and a passageway P denoted by the dashed line in FIGS. 2A and 2B exists between an ambient side A of the housing 16 and a high vacuum side HV of the housing. When the piston 26 is moved to a position adjacent to the front wall 32 of the cylinder body 20, as shown generally in FIGS. 2A and 2B, the gate assembly 14 encroaches into the passageway P and effectively blocks it off. Pilot wheels 50, mounted to side rails 52 of the gate valve assembly 14 follow parallel machined races 54 defined along inside edges of the housing 16, and thereby guide the gate valve assembly 14 from a fully retracted position beyond the passageway P to the initial closure position illustrated in FIG. 2A.

At the initial closure position, the pilot wheels 50 have just come into contact with pilot wheel limits 56 which are attached to the angled valve seat assembly 18. At this initial closure position, a planar sealing face 58 of the angled valve seat assembly 18 is at a first acute angle with respect to a longitudinal axis LA of the valve 10, and an angled valve face 60 of the gate valve 14 is at another acute angle with respect to the longitudinal axis LA. These two angles differ by a predetermined small angle alpha, which is typically about 2 degrees. A suitable high vacuum seal 62 is provided on the face 60 of the gate valve assembly 14. As perhaps best seen in FIG. 6B, the angled face 58 of the seat assembly 18 is a peripheral area surrounding the passageway P, whereas as perhaps best seen in FIG. 1 the angled face 60 of the gate valve assembly 14 is continuous and solid across its entire extent.

A spring-loaded hinge mechanism 62 is formed between the valve assembly fixed plate 42 and a rocker block 64. The rocker block 64 is pivotally secured to the fixed plate 42 and is fixedly secured to an elongated transverse angle block 66 forming the gate valve angled face 60. When continued pressure from the control fluid is applied against the piston 28, the resultant driving force is applied by the actuator arm 28 to the gate valve assembly 14 with the consequence that the pilot wheels 50 (after having been stopped from further forward translation by the pilot wheel stops 56) form a first pivot fulcrum, whereas the spring loaded hinge mechanism 62 forms a second pivot fulcrum, and the block 66 and its gate valve face 60 rotate slightly, e.g. through the difference angle alpha so as to form a high vacuum seal between the gate valve face 60 and seal 62 and the angled face 58 of the seat assembly 18. This arrangement has been discovered to provide a very effective low vibration, high cycle, high vacuum gate valve.

Figure 3A:
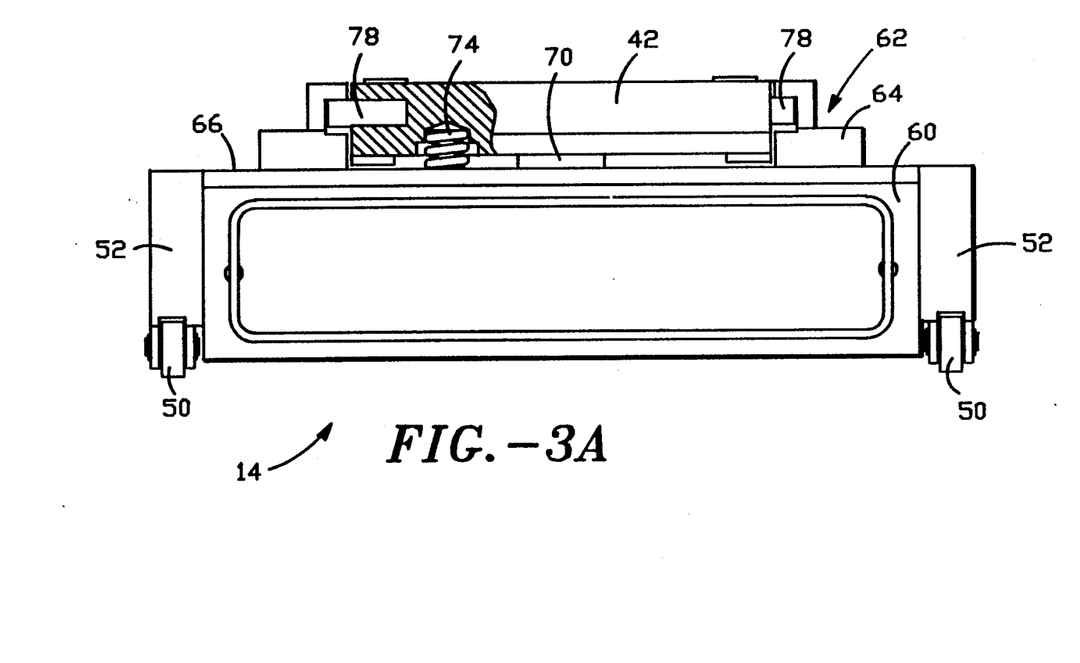
FIG. 3A is a top plan view of a pivotable gate valve portion of the FIG. 1 gate valve and actuator assembly. This view is in partial section in order to illustrate one of two bias springs and stop pins in relation to the pivot pin.
Figure 3B:
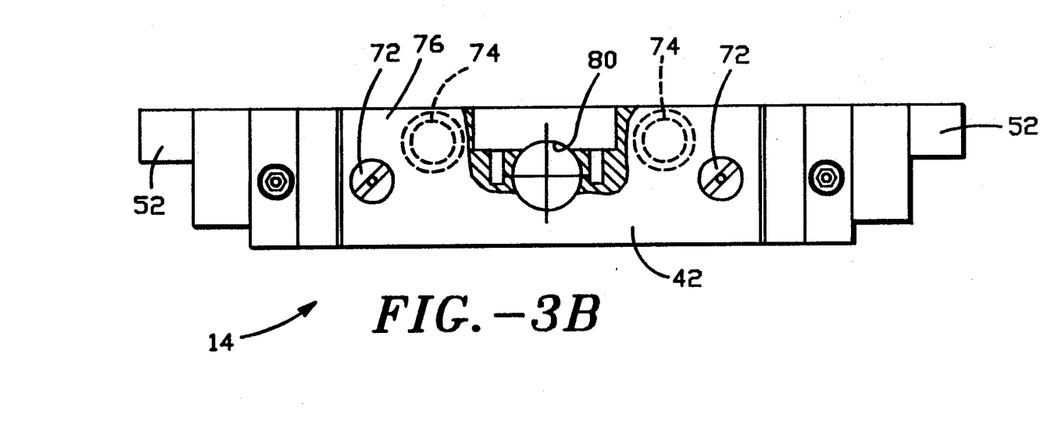
FIG. 3B is a rear view in elevation of the FIG. 3A pivotable gate valve portion, the FIG. 3B view being a 90 degree rotation from the FIG. 3A view along a longitudinal axis. This view shows the relative locations of the springs by dashed line hidden view.
Figure 3C:
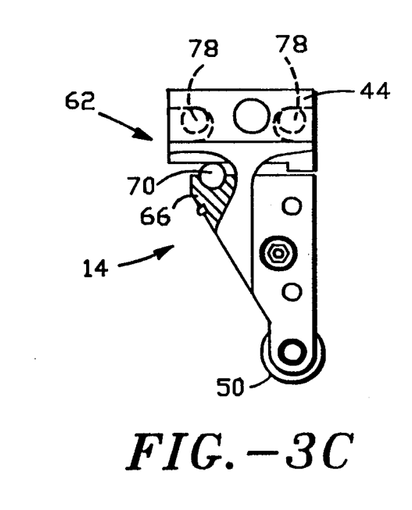
FIG. 3C is a side view in elevation and partial section of the FIG. 3A pivotable gate valve portion, the section illustrating the pivot pin.
Figure 4A:
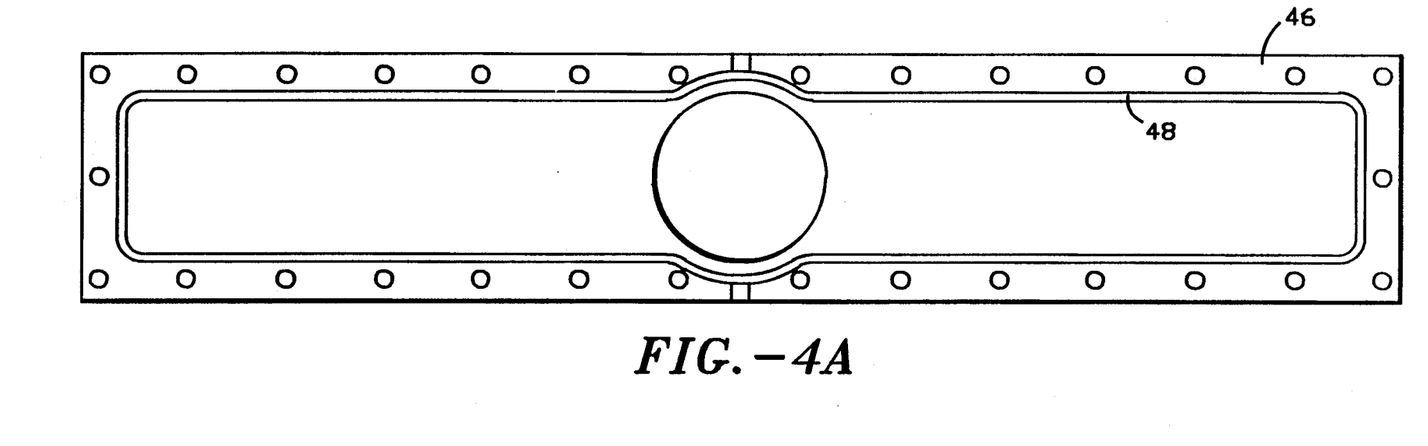
FIGS. 4A, 4B and 4C are views of the high vacuum mounting plate of the FIG. 1 high vacuum gate valve and actuator assembly, FIG. 4A showing a sealing surface in elevation, FIG. 4B showing an edge view of the plate, and FIG. 4C showing a an external surface elevation of the plate.
Figure 4B:
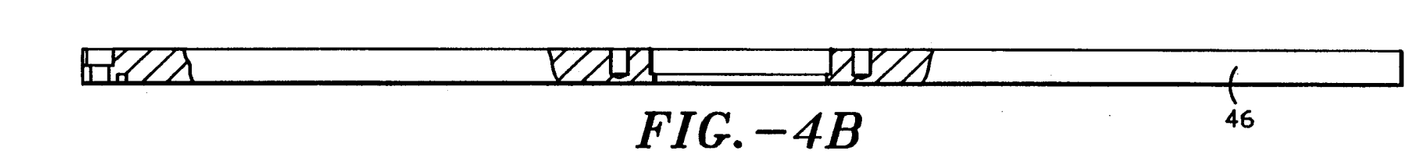
Figure 4C:
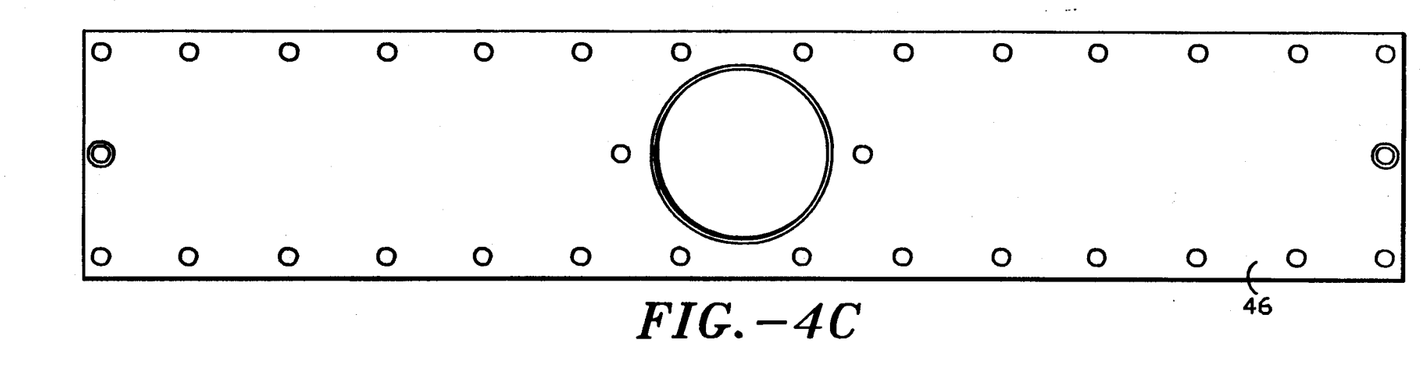
Figure 5A:
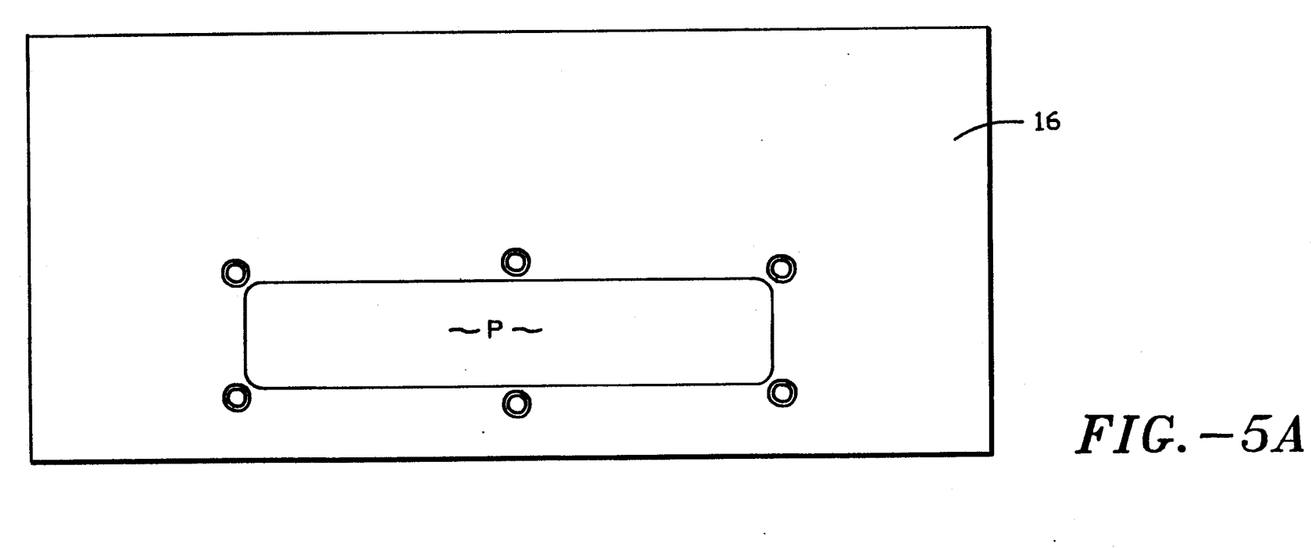
FIG. 5A is an elevation of a high vacuum side of the housing; and, FIG. 5B is a front view in elevation of the housing as viewed from the perspective of the FIG. 1 valve and actuator assembly.
Figure 5B:
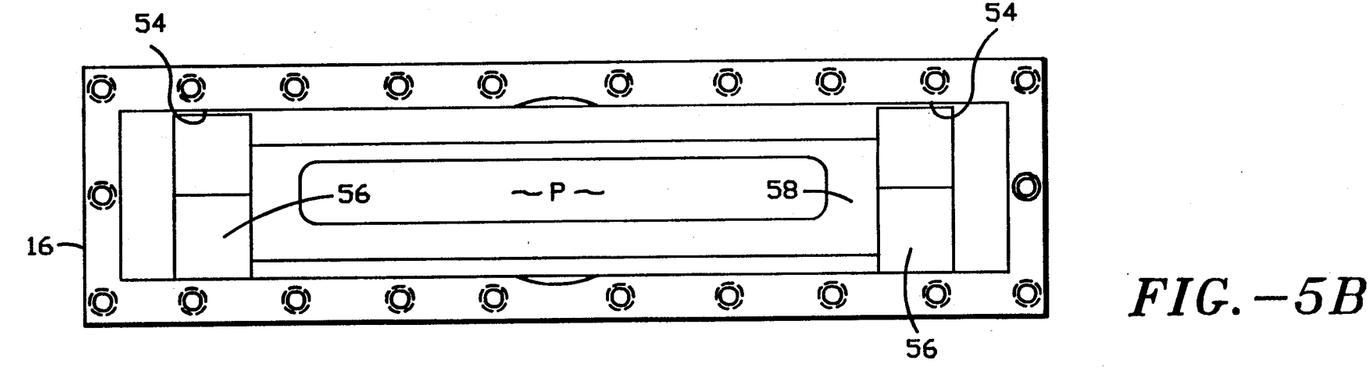

Turning now to FIGS. 3A, 3B and 3C, the hinge mechanism 62 will be explained in greater detail. A transverse pivot pin 70 is located within two oppositely facing transverse pin seats formed respectively in the fixed plate 42 and an oppositely facing wall of the elongated angle block 66. The pivot pin 62 defines the axis of rotation of the hinge mechanism 26. Two threaded bolts 72 pass through oversize openings of the fixed plate 42 and thread into aligned threaded openings formed in the angle block 66. The bolts hold the angle block 66 to the fixed plate 42 but permit a limited degree of rotation therebetween. Two compression springs 74 exert a bias force against a lower edge area 76 between the fixed plate 42 and the angle block 66. This bias force is transferred by the bolts 72 to the pivot pin. Four dowel pins 78 are press fit into suitable end openings of the fixed plate 42. The dowel pins 78 cooperate with four oversize vertical slots defined by the rocker plate 64. These slots further align the angle block 66 relative to the fixed plate 42, and still permit the requisite limited degree of rotation through the difference angle alpha.

The actuator rod 28 is rigidly secured to the fixed plate at a central opening 80. Thus, the pilot wheels 50 on one side of the actuator rod 28 form one fulcrum for the angle block 66, while the pivot pin 70 located on the other side of the actuator rod 70 form the other fulcrum provided by the hinge assembly mechanism 62.

Figure 6A:
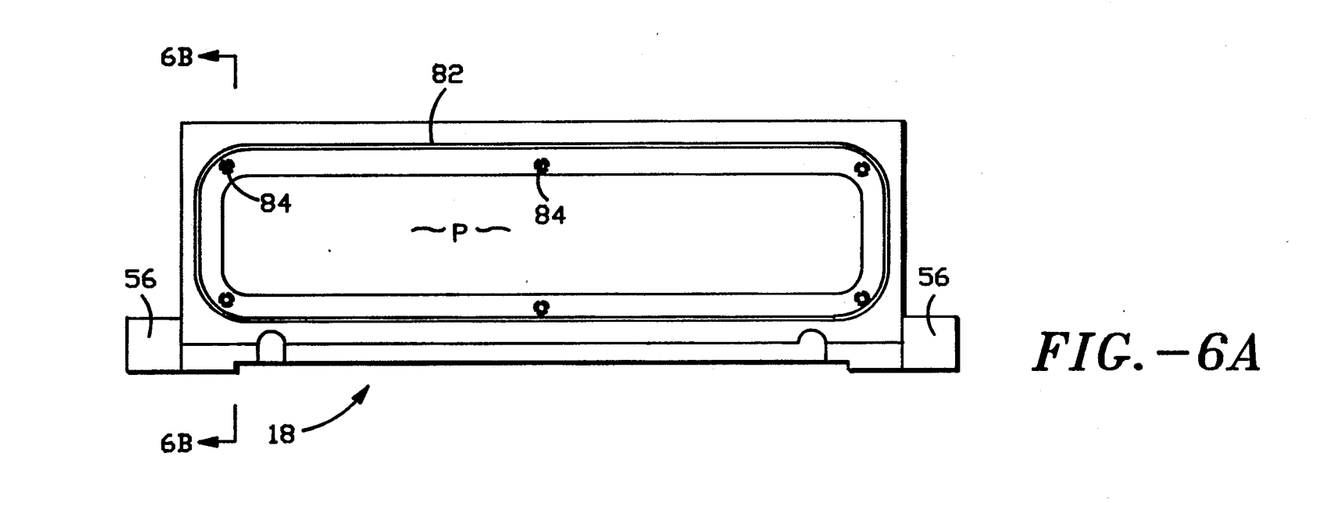
FIG. 6A is a front view in elevation.
Figure 6B:
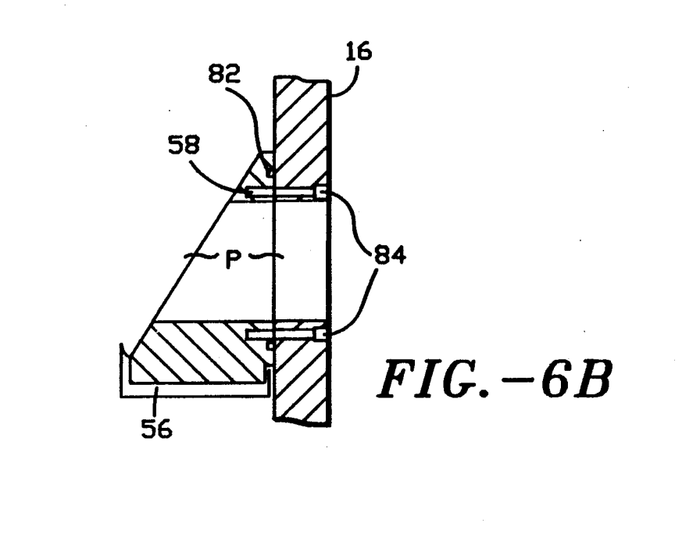
Figure 6C:
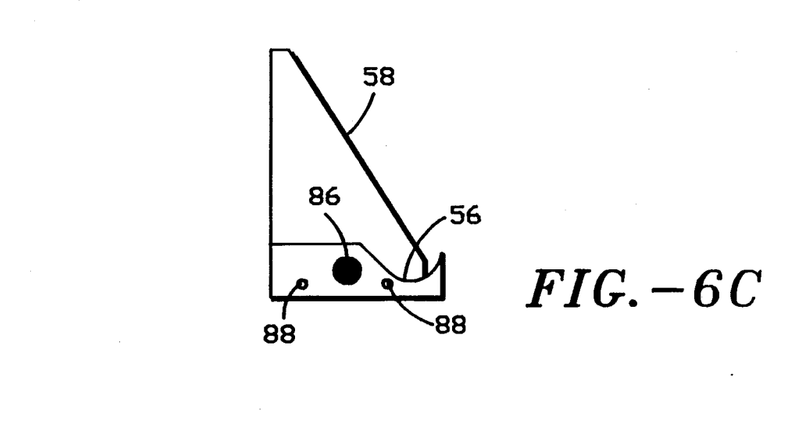
FIG. 6C is an end view of the FIG. 6A fixed valve seat assembly illustrating placement of the right side wheel stop bar.

As shown in FIG. 6A, the fixed seat assembly 18 includes a high vacuum seal 82. Threaded bolts 84 enable the assembly 18 to be secured to the valve housing 16 in a high vacuum sealing arrangement. Threaded bolts 86 and dowel pins 88 align and secure the pilot wheel stops 56 to the main body of the fixed seat assembly. Each pilot wheel stop 56 defines a generally arcuate stop contour sized to engage and stop forward translational movement of the pilot wheels 50 without any resultant binding or interference.

As shown in FIGS. 2A and 2B, bolts 90 and dowel pins 92 align and secure the pilot wheel side rails 52 to the gate angle block 66. The components of the valve 10 may be formed of materials which are compatible with the processes ongoing within high vacuum environments. Anodized black aluminum and machined stainless steel alloy components are preferred for most high vacuum process environments.

While a rectangular gate valve 10 has been described, it will be apparent to those skilled in the art that the invention is applicable to other configurations of the gate and case, such as circular, ovoid or square, etc.

To those skilled in the art to which the present invention pertains, may widely varying embodiments and implementations of the principles of the present invention will be suggested from the foregoing. The description and the disclosures present herein are by way of illustration only and should not be considered to limit the present invention, the scope of which is more particularly set forth in the following claims.

What is claimed is:

1. A gate valve for a structure defining a longitudinal passageway and a generally transverse gate raceway relative to the longitudinal passageway, the raceway defining a pair of transverse gate races and a seating surface surrounding an opening in the longitudinal passageway, the seating surface generally facing the gate races and defining a predetermined acute angle with respect to the raceway, the gate races defining stops, the gate valve further comprising:

seal means moveably disposed within the gate raceway, the seal means linearly displaced along the raceway and including a pair of guide wheel means for following the gate races and for providing first fulcrum means for rotating the seal means toward the seating surface when the stops are reached, the seal means defining a gate sealing surface for contacting and sealing off the seating surface of the raceway when the seal means is rotated, hinge means for hinging the seal means to a carriage means, valve actuator means for applying a rectilinear force to the carriage means to displace the carriage means along the raceway until the stops are reached and to cause the seal means to rotate at the first fulcrum means and seal against the seating surface in response to further rectilinear force after the stops have been reached.

2. The gate valve defined by claim 1 further comprising hinge assembly means including bias spring means between the carriage means and the seal means for biasing the seal means slightly away from the seating surface until the seal means is rotated at the first fulcrum means.

3. The gate valve defined by claim 1 wherein the angle formed by the junction of the raceway and the seat surface lies in a range between 1 and 10 degrees.

4. The gate valve defined by claim 1 wherein the stops of the gate races are beyond the opening.

5. The gate valve defined by claim 2 wherein the hinge means further comprises bearing means for restricting the rotation of the seal means.

6. A low vibration, high cycle, high vacuum gate valve structure comprising a high vacuum housing means defining a passageway, a valve actuation means for providing a rectilinear displacement force, translatable and pivotable gate valve assembly means actuated by the valve actuation means for translating from a fully retraction position outside of the passageway to an initial closure position adjacent fixed seal surface means provided within housing means thereby blocking the passageway, the gate valve assembly means defining an angled sealing surface relative to an oppositely facing angled sealing surface of the fixed seal means and displaced by a predetermined angular displacement at the initial closure position, the gate valve assembly means including fulcrum means defined at the initial closure position for causing the gate valve assembly means to rotate through the predetermined angular displacement in response to further rectilinear displacement force from the valve actuation means until a final closure position is reached at which the gate valve assembly means closes and seals against the angled sealing surface of the fixed seal means.

7. The valve structure set forth in claim 6 wherein the valve actuation means comprises a cylinder and piston.

8. The valve structure set forth in claim 6 wherein the gate valve assembly means comprises a pair of pilot wheels, and the housing means comprises a pair of wheel stops aligned to stop rectilinear movement of the pilot wheels at the initial closure position, the pilot wheels and the wheel stops defining the first fulcrum means at the initial closure position.

9. The valve structure set forth in claim 6 wherein the gate valve assembly means comprises a fixed plate means connected to the actuation means, and a hinge assembly comprising rocker plate means secured to an angle block means defining the angled sealing surface of the gate valve assembly means, pivot pin means defining a second fulcrum between the fixed plate means and the angle block means, and bias spring means for biasing the angled sealing surface away from the fixed seal means at the initial closure position.

10. The valve structure set forth in claim 9 wherein the fixed plate means comprises a plurality of alignment dowel pin means, and the rocker plate means defines a plurality of oversize grooves generally aligned with the alignment dowel pin means for aligning the angle block means to the fixed plate means and for limiting the degree of rotation of the gate valve assembly means relative to the fixed seal means.

* * * * *